Oct. 30, 1928.  1,690,008
E. E. GREVE
AUTOMATIC RELEASING TONGS
Filed June 4, 1925
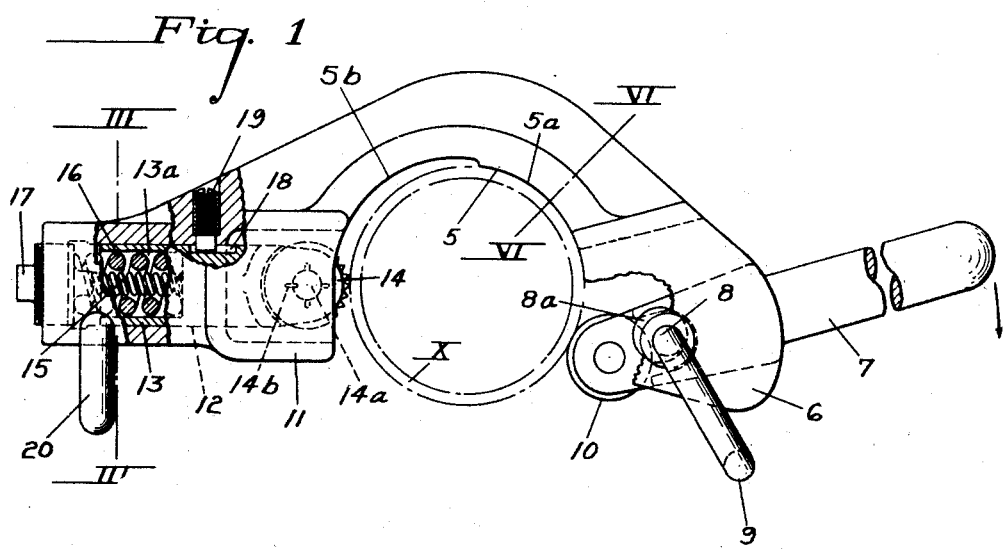
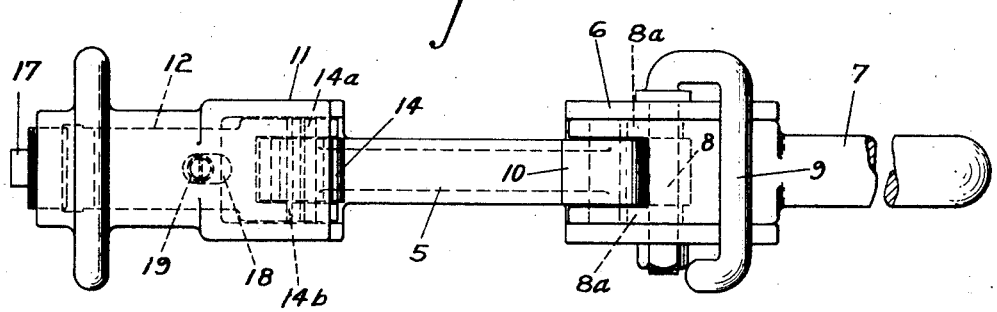
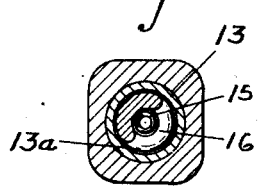
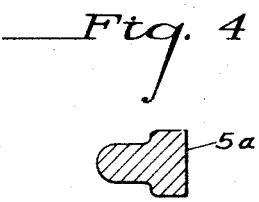
INVENTOR.
E. E. Greve
BY
Doolittle
ATTORNEY.

Patented Oct. 30, 1928.

1,690,003

UNITED STATES PATENT OFFICE.

EDGAR E. GREVE, OF BELLEVUE, PENNSYLVANIA.

AUTOMATIC RELEASING TONGS.

Application filed June 4, 1925. Serial No. 34,847.

This invention is for a pipe tong for use particularly in connection with rotary earth drilling outfits, and particularly to that type of tong which automatically releases when a pipe joint is taken up to prevent stripping of threads when the wrench or tong is being rotated by power driven machinery.

The present application is for an improvement on and is a continuation in part of my copending application Serial No. 540,169, filed March 1, 1922, for an automatic releasing tong.

The construction and operation of the invention may be readily understood by reference to the accompanying drawings, in which:

Fig. 1 is a plan view of the automatic releasing tong, showing a part thereof broken away to disclose a part of the mechanism;

Fig. 2 is a side elevation thereof; and

Figs. 3 and 4 are transverse sections on lines III—III and IV—IV respectively.

In the construction shown in Figs. 1 to 4 inclusive, 5 designates a main jaw member of a somewhat U-shaped form, having a bifurcated end 6 in which is received the tong handle 7. The tong handle is pivotally retained in place by a transverse pin 8 which preferably has an extension 9 bent over to form a hook-line handle, as shown. On the inner end of the tong handle 7 is a pipe engaging element or part, preferably in the form of a roller 10. The bifurcation or recess of the jaw at 6 is such that when the tong handle 7 swings relatively to the main jaw in the direction of the arrow in Fig. 1, which is also the direction in which pressure is applied to the handle for screwing up a pipe joint, the inner end of the handle with its roller may be received in such bifurcation or recess where it is out of pipe engaging position.

In the other end 11 of the main jaw, which is suitably formed and shaped with a transverse extension, is a longitudinal passage 12. In this passage is a plunger 13 having a pipe gripping element, such as the toothed roller 14 at its outer end. The inner end of the plunger is preferably recessed at 13$^a$ to receive the ends of one or more compression springs. I prefer to use a light spring 15 and a heavy spring 16. Both of these springs seat against a removable plug 17, which provides an adjustment therefor.

The roller 14 is preferably fast on its pin 14$^a$, and the pin is preferably held from turning by a key, such as 14$^b$. There may be a plurality of key ways in the pin, so that, by removing the key and partially rotating the roller, a new toothed surface may be presented in pipe engaging position, whereby compensation is made for the wear in the roller teeth.

The plunger preferably has a groove 18 therein into which the end of a limit pin or screw 19 projects to limit the reciprocable movement of the plunger.

A portion of the inner face of the main jaw, designated 5$^a$, is curved for contact with the pipe X. Another portion 5$^b$ of this surface is recessed to provide clearance for the movement of the tong when it releases.

The main jaw member may be provided with a suitable handle 20, if so desired.

In operation, the tong is applied to a pipe, such as X, in the manner shown. Upon moving the handle 7 in the proper direction, the pipe X is rotated. When the pipe offers a predetermined resistance to turning, the spring pressed roller 14 will be depressed against the pressure of springs 15 and 16, and the handle 7 will rotate through a limited arc with respect to the main jaw. Such movement will shift the roller 10 out of pipe gripping position, and the tong will be released.

The light spring functions to maintain the member 14 in operative pipe gripping position, while the release of the tong is effected against the heavy spring 16. This greatly facilitates the application of the tong to a pipe. As there can ordinarily be only enough clearance to enable the tong to be slipped onto a pipe, it is desirable that eccentric bushings 8$^a$ be provided on the fixed pin 8 so that the handle 7 will rotate about a point slightly eccentric to the axis of the handle, whereby, with a given swing of the handle, the roller 10 will move further out of pipe engaging position than if the handle was not so pivoted. As only a very slight additional clearance is necessary, the eccentric movement thus obtained need only be very small.

While I have described and shown specific embodiments of the invention, it will be understood that this is merely by way of illustrating the spirit of the invention.

I claim as my invention:

1. In a pipe tong, a curved jaw member, a handle pivotally secured to the jaw member and engageable with a pipe, a spring projected pipe engaging means on the jaw member, said handle being movable in an arc from pipe engaging to pipe releasing position upon forcing the spring projected pipe engaging means to retracted position.

2. A self-releasing tong including a curved jaw member of a substantially U-shape, one end of the jaw member having a handle pivotally secured thereto, said handle having a pipe engaging portion at its inner end movable, by swinging the handle with respect to the jaw, into and out of pipe engaging position, and a spring projected pipe engaging means on the other end of the U-shaped jaw.

3. A self-releasing tong including a substantially U-shaped jaw member having a handle pivotally secured to one end thereof, said handle having an inner end with a pipe engaging means thereon, said jaw member being recessed to receive the pipe-engaging end of said handle when the handle is swung relatively to the jaw into releasing position, and a spring projected pipe engaging element near the other end of said jaw member.

4. A self-releasing tong including a substantially U-shaped jaw member having a handle pivotally secured to one end thereof, said handle having a pipe engaging element on its inner end, the inside face of the curved jaw member adjacent the end to which the handle is secured being curved to provide a pipe engaging face, the remaining inner surface of the U-shaped jaw being recessed with respect to the curved pipe engaging face, and a spring projected pipe engaging element at the other end of the U-shaped jaw member.

5. A self-releasing tong including a substantially U-shaped jaw member having a transverse extension at one end thereof and having its other end bifurcated, a handle pivoted in the bifurcated end and having a pipe engaging element on its inner end, a plunger having a pipe engaging means in the transverse extension of the other end, and a spring for urging the plunger outwardly toward the pivoted handle.

6. A self-releasing tong including a substantially U-shaped jaw member having a transverse extension at one end thereof and having its other end bifurcated, a handle pivoted in the bifurcated end and having a pipe engaging element on its inner end, a plunger having pipe engaging means in the transverse extension of the other end, a spring for urging the plunger outwardly toward the pivoted handle, and means for limiting the movement of the plunger.

7. A self-releasing tong comprising a curved jaw member, a handle pivotally carried at one end of the jaw member adapted to engage a pipe, a spring projected pipe engaging element on the other end of the jaw member, said handle being movable in an arc from pipe-engaging to pipe-releasing position upon forcing the spring-projected pipe engaging element to retracted position.

8. A self-releasing tong including a substantially U-shaped jaw member having a transverse extension at one end thereof and having its other end bifurcated, a handle pivoted in the bifurcated end and having a pipe engaging element on its inner end, a plunger having a pipe engaging element on its outer end disposed in the transverse extension of the other end, a spring for urging the plunger outwardly toward the pivoted handle.

9. A self-releasing tong including a substantially U-shaped jaw member having a handle pivotally secured to one end thereof, said handle having an inner end with a pipe engaging means thereon, said jaw member being recessed to receive the pipe-engaging end of said handle when the handle is swung relatively to the jaw into releasing position, and a spring projected pipe engaging element near the other end of said jaw member, said element comprising a toothed roller, and means for adjustably holding the roller against rotation.

In testimony whereof I affix my signature.

EDGAR E. GREVE.